June 2, 1936.　　J. C. DUNN ET AL　　2,043,193
LUMINAIR
Filed June 19, 1935
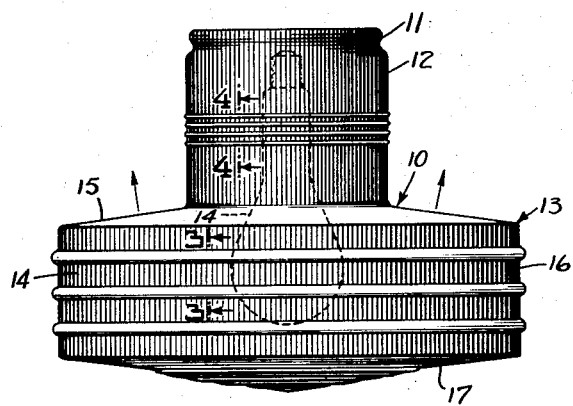
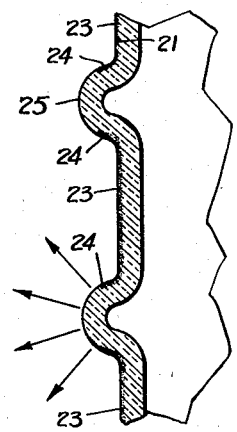
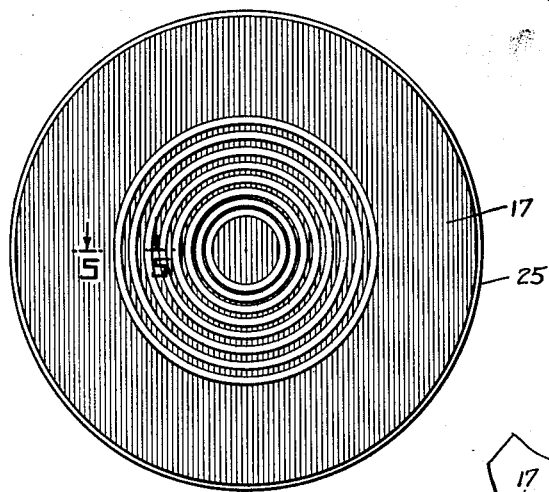
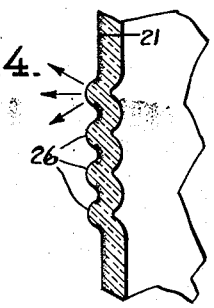
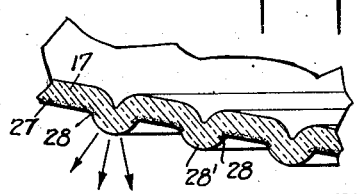
INVENTORS
John Canice Dunn and
Max Klein
BY
ATTORNEY Patented June 2, 1936

2,043,193

UNITED STATES PATENT OFFICE 2,043,193

LUMINAIR

John Canice Dunn, Port Jervis, and Max Klein, Brooklyn, N. Y., assignors to Gillinder Brothers, Inc., Port Jervis, N. Y., a corporation of New York Application June 19, 1935, Serial No. 27,334

7 Claims. (Cl. 240—100)

The present invention relates to luminairs, and is more particularly directed toward luminairs having enclosing glass globes.

It is customary to provide lighting units for luminairs with an enclosing globe made of diffusing glass. This glass may be opal glass so as to be diffusing throughout its entire area or may have a transparent upper portion and diffusing side walls and bottom. With enclosing globes of the type just referred to, the entire bowl may appear luminous and have practically the same surface brightness throughout its entire area. Bowls of this type are limited as to ornamental design more or less to the shape in which the glass can be made.

According to the present invention, the globe, which may be of pressed or blown glass, is so designed as to provide comparatively narrow areas such as bands, rings, or the like of clear crystal glass, alternated with areas of a diffusing nature, so as to provide bright bands contrasting with the diffusing areas and in a manner that appreciable shadowing is avoidable.

The diffusing nature may be imparted to the glass by etching, enameling, or in any other suitable manner. Clear crystal ribs may be placed on the sides and bottom of the globe and may have various shapes, forms and contours to alter the ornamental appearance and design of the globe. The diffusing areas act to diffuse the light and lower the brightness of the surface of the globe, while the narrow crystal areas transmit the light without producing a mat surface, although they may scatter the light considerably, owing to the prismatic action of the glass forming the ribs. In this way a sparkling appearance is given to the fixture, as determined by the arrangement of the crystal areas.

The accompanying drawing shows for purposes of illustrating the present invention one of the many embodiments in which the invention may take form, it being understood that the drawing is illustrative of the invention rather than limiting the same.

In this drawing:

Fig. 1 is a side elevational view of the luminair;

Fig. 2 is an inverted plan view of the enclosing globe;

Figs. 3 and 4 are enlarged vertical sectional views on the lines 3—3 and 4—4 of Fig. 1; and Fig. 5 is a radial sectional view through the bottom of the globe taken on the line 5—5 of Fig. 2.

The globe 10 is made of one piece of blown crystal glass and is therefore of uniform thickness and homogenous throughout. As shown in the drawing, it has a lip 11 at the top for securement to the usual fitter, and an upper small diameter portion 12 which supports the body 13 of the globe about the lamp bulb, indicated at 14.

For purposes of illustration the globe is shown as having a cylindrical neck 12, a downwardly and outwardly sloping roof portion 15, vertical side wall portion 16 and a bottom portion 17. The side walls 16 of the body portion of the globe have a corrugated cross-section as indicated in Fig. 3, the upper or neck portion of the globe has a corrugated cross-section, as indicated in Fig. 4, and the bottom 17 of the globe has a corrugated cross-section as indicated in Fig. 5.

In order to reduce the glare and provide for diffusion of the light, the surface of the globe which is in the ordinary line of vision is rendered diffusing by etching, enameling, or otherwise, except for the raised portions of the corrugations. The diffusing nature of the glass is indicated by stippling 21 placed inside the cross-section of glass. As shown in Fig. 3, the diffusing nature of the glass is carried down through the vertical areas 23 and outwardly as indicated at 24 on the beads 25. The crests 26 of the corrugations on the neck of the globe are free of the etching or enameling and are therefore clear crystal glass. In Fig. 5 the diffusing nature of the glass is extended from the bottom area 27 on to the sides of the corrugations indicated at 28. The corrugations are clear as indicated at 28'.

It will be noted that the dominant area within the line of direct vision are of a diffusing nature, and that the outwardly projecting elements of crystal glass alternate with the diffusing areas. The direct light transmitted through the crystal glass is broken up owing to the prismatic action of the glass so as to be emitted in various directions and produce a pronounced sparkle in contrast with the diffusing areas. The crystal glass areas are narrow enough to avoid light streaks of annoying brightness. These crystal areas may partake of any suitable form or design to ornament the globe, and may be placed on the sides of the globe, upper part of the globe or on the bottom of the globe.

It is obvious that the invention may be embodied in many forms and constructions within the scope of the claims, and we wish it to be understood that the particular form shown is but one of the many forms. Various modifications and changes being possible, we do not otherwise limit ourselves in any way with respect thereto.

What is claimed is:

1. A luminair comprising a light source, and an annular one-piece blown glass enclosing globe of substantially uniform thickness throughout, the side walls of the globe having circumferential outwardly projecting ribs of crystal glass and interposed bands of a diffusing nature, the globe having a bottom wall provided with downwardly projecting annular ribs of crystal glass and interspersed areas of a diffusing nature.

2. A luminair comprising a pendant light source, an annular enclosing glass globe having an upper diffusing portion of comparatively small diameter, a lower diffusing portion of larger diameter, a diffusing bottom wall and a top wall interconnecting the upper and lower portions, the lower portion having narrow projecting ribs of clear glass to provide bright bands contrasting with the dominant diffusing areas.

3. A luminair comprising a pendant light source, an annular enclosing glass globe having an upper diffusing portion of comparatively small diameter, a lower diffusing portion of larger diameter, a diffusing bottom wall and a top wall interconnecting the upper and lower portions, the upper portion having narrow projecting ribs of clear glass to provide bright bands contrasting with the dominant diffusing areas.

4. A luminair comprising a pendant light source, an annular enclosing glass globe having an upper diffusing portion of comparatively small diameter, a lower diffusing portion of larger diameter, a diffusing bottom wall and a top wall interconnecting the upper and lower portions, the upper and lower portions having narrow projecting ribs of clear glass to provide bright bands contrasting with the dominant diffusing areas.

5. A luminair comprising a pendant light source, an annular enclosing glass globe having an upper diffusing portion of comparatively small diameter, a lower diffusing portion of larger diameter, a diffusing bottom wall and a top wall interconnecting the upper and lower portions, the bottom wall having narrow projecting ribs of clear glass to provide bright bands contrasting with the dominant diffusing areas.

6. A luminair comprising a light source, and a blown glass, light-source-enclosing globe of uniform thickness and homogenous throughout and having an annular wall, the globe having circumferentially disposed diffusion areas alternating with similarly disposed narrow, transversely curved, light transmitting ribs of crystal glass which refractively transmit light to provide bright bands contrasting with the diffusing areas, the diffusing areas breaking up and diffusely transmitting light and being disposed over the entire non-ribbed area of the globe visible at ordinary angles of observation so that the source is concealed thereby.

7. A luminair comprising a light source, and a one-piece blown glass globe enclosing the light source and having an annular wall and a substantially flat bottom wall of substantially uniform thickness and homogenous throughout, the bottom wall having annular transversely curved ribs of crystal glass and interposed areas of a diffusing nature.

JOHN CANICE DUNN.
MAX KLEIN.